Oct. 4, 1949.  G. O. BENSON  2,483,396
TELESCOPIC STRUCTURE
Filed June 16, 1945
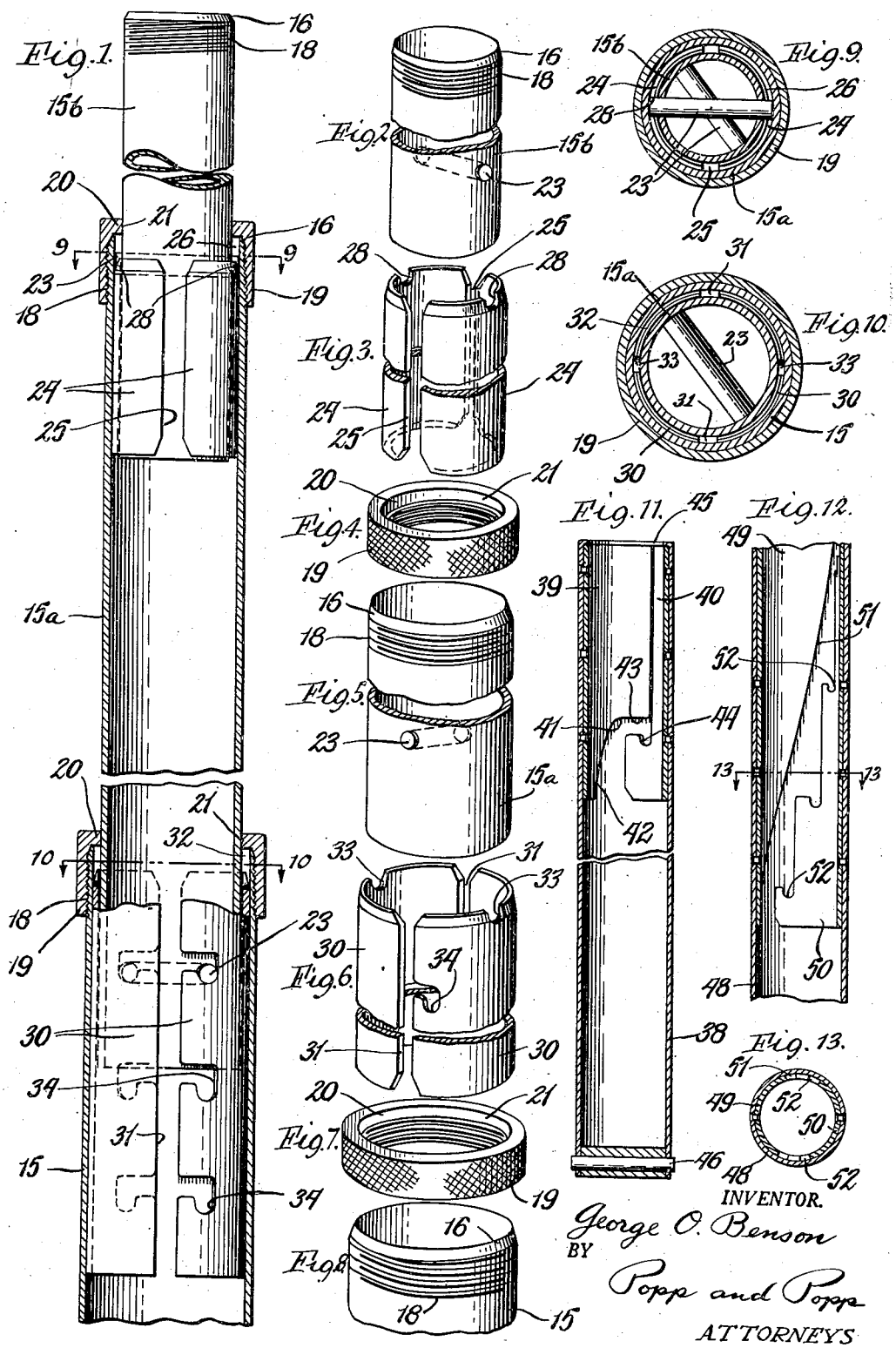
INVENTOR.
George O. Benson
BY
Popp and Popp
ATTORNEYS Patented Oct. 4, 1949

2,483,396

UNITED STATES PATENT OFFICE 2,483,396

TELESCOPIC STRUCTURE

George O. Benson, Niagara Falls, N. Y., assignor to Chisholm-Ryder Company, Incorporated, Niagara Falls, N. Y., a corporation of New York Application June 16, 1945, Serial No. 599,925

4 Claims. (Cl. 287—58)

This invention relates to a telescopic structure and more particularly to such a structure, such as a portable radio antenna, composed of telescoping sections which are nested together and which can be rapidly extended to provide a mast capable of being set upon any mobile or stationary support and used for sending or receiving radio messages. However, the invention is not confined to any particular use and can also be used as a telescopic support for signal lights and for other like uses, such as tent poles.

One of the principal objects of the present invention is to provide such a telescopic structure in which the sections can be quickly extended and quickly collapsed and in which the structure is securely held in its extended position with little danger of accidental release.

Another object is to provide such a telescopic structure which, when extended, is strong and will adequately resist axial, torsional and bending strains.

Another object is to provide such a telescoping joint including a cross pin in which the cross pin can be located so as to impair the strength of the telescopic joint to the least degree.

Another object is to provide a telescopic structure which does not require tools to extend or collapse the several sections.

Another aim is to provide such a telescopic structure which is simple and inexpensive in construction and can be repeatedly extended and nested without objectionable wear or deterioration.

Other objects and advantages will appear from the following description and drawings in which:

Fig. 1 is a fragmentary longitudinal section, partly in elevation, of several sections of a telescopic mast embodying my invention.

Figs. 2–8 represent an exploded perspective view of the several parts illustrated in Fig. 1.

Figs. 9 and 10 are transverse sections taken on the correspondingly numbered lines on Fig. 1.

Fig. 11 is a fragmentary view similar to Fig. 1 and showing a modified form of the invention.

Fig. 12 is a fragmentary view similar to Figs. 1 and 11 and showing another form of the invention.

Fig. 13 is a transverse section taken on line 13–13, Fig. 12.

While the invention is not confined to any particular use, it is shown as embodied in a metal antenna mast which has a tubular metal base or enclosing section 15, a next succeeding section 15a and any number of succeeding sections 15b, all of which sections are of progressively smaller diameter so as to telescope into one another and into the base section 15 so that in the nested condition of the parts the entire mast is contained within the base section 15. Except as to the necessary differences in diameter, the sections 15, 15a and 15b are generally similar in construction and hence the same reference numerals have been applied to those parts which are identical except as to size.

The outer end of each section 15, 15a, 15b is shown as being beveled, as indicated at 16, this not being necessary, however, and as being externally threaded, as indicated at 18, to receive a threaded retaining ring 19, each of these retaining rings 19 having an inwardly projecting annular flange 20 which is beveled to fit the bevel 16 and also has a bore 21 fitting the periphery of the next succeeding smaller section.

Each of the sections 15a and 15b is provided at its opposite end with a cross pin 23, the base section 15 being unprovided with such a pin inasmuch as it is the larger terminal section of the mast. These pins extend diametrically through the sections 15a, 15b at a substantial distance from the adjacent inner ends thereof and the opposite ends of each pin project outwardly from the periphery of its section 15a, 15b a distance approximately equal to the space between its section and the next succeeding larger section.

Except for the smallest or tip section, each of the sections is provided at its outer end with means engaging and supporting the pin 23 of the next succeeding smaller section so as to hold the mast in an extended condition. With each of the sections 15a, 15b these means comprise a pair of semi-cylindrical plates 24 which are fitted in the outer end of each of the sections in opposed relation to each other and can be secured to the section by welding, riveting, brazing or in any other suitable manner. Each pair of these plates 24 have their longitudinal opposing edges spaced from each other to provide a pair of opposite ways or grooves 25 which are of a width to receive the projecting ends of the pin 23 of the next succeeding smaller section and thereby permit this pin to pass the plates 24. The plates are also positioned at a distance from the outer end of the corresponding section 15a, 15b so as to provide a circumferentially extending annular way 26 between the ends of each pair of plates 24 and the adjacent retaining ring 19, these circumferential ways 26 likewise being of a width to receive the projecting ends of the pin 23 of the next succeeding smaller section. At its outer end each of the plates 24 is provided with an axially extending notch 28 which is shaped to receive the corresponding end of the companion pin 23. These notches may be of any desired shape or depth and are preferably located at the centers of the plates 24 so that the companion notches are diametrically opposite each other to receive the opposite ends of the companion pin 23.

The base section 15 is provided at its outer end with a pair of semi-cylindrical plates 30 which are generally similar to the plates 24 except that they are formed to support the pin 23 of the succeeding section 15a at different elevations thereby to permit of adjusting the height of the mast. Thus, these semi-cylindrical plates 30 are secured within the upper end of the base section 15 in any suitable manner and with their longitudinal edges in opposed spaced relation to each other to provide opposite axially extending ways 31 for the projecting ends of the pin 23 of the section 15a. Also these plates 30 are spaced from the outer end of the section 15 to provide a circumferential way 32 for the projecting ends of this pin and each plate is provided in its outer end edge with a notch 33 similar to the notches 28 of the plates 24 and arranged diametrically opposite each other to receive and retain the opposite projecting ends of the pin 23 of the section 15a. However, each plate 30 is provided along one of its edges with a plurality of bayonet slots 34 of sufficient width to receive the corresponding end of the pin 23 of the section 15a, each of these bayonet slots 34 being opposite a companion bayonet slot 34 of the companion plate 30 so that each pair of the bayonet slots 34 on the pair of plates 30 can receive and retain the opposite projecting ends of the pin 23 of the section 15a.

In setting up the mast it will be seen that each tubular section 15b can be withdrawn from the next succeeding larger section until the projecting ends of its pin 23 engages the inner ends of the pair of plates 24 of this larger section. The section being withdrawn is then turned until the projecting ends of its pin 23 comes into register with the axially extending ways 25 provided beween the opposing edges of these plates 24, whereupon the section being withdrawn can be withdrawn further, the projecting ends of its pin 23 traveling along the ways 25 until they strike the inwardly projecting flange 29 of the corresponding screw ring 19. When this occurs the sections can be rotated relative to each other, the projecting ends of the pin 23 of the section being withdrawn traveling in the circumferential way 26 between this screw ring and the adjacent plates 24. This rotation of the sections relative to each other is continued until the projecting ends of the pin 23 find the diametrically opposite notches 28 in the plates 24 into which they drop so as to restrain the sections against further rotation relative to each other and to hold the two sections in their extended position.

In withdrawing the section 15a from the base section 15 an adjustment of the length of the mast can be effected. Thus, in withdrawing the projecting ends of the pin 23 of the section 15a along the ways 31 any one of the series of pairs of bayonet slots 34 can be selected and the sections 15 and 15a turned relative to one another when the projecting ends of this pin come into register with the selected pair of bayonet slots 34. Upon then turning the sections 15, 15a relative to each other the projecting ends of the pin 23 of the section 15a will be caught and retained in the depending part of the bayonet slot. It will be seen that the length of the mast will depend upon which of the pairs of bayonet slots 34 is selected and that the maximum length is obtained by moving the pin 23 of the section 15a the full length of the way 31 and then turning the sections to cause the projecting ends of this pin to traverse the circumferential way 32 until they seat themselves in the notches 33.

It will also be seen that nesting the sections 15a and 15b in the base section 15 merely requires a reversal of the above procedure. Thus, to telescope any of the sections 15b into the next larger section 15b or 15a, the smaller section is drawn axially outward to free the projecting ends of its pin 23 from the pair of notches 28 in which they were seated whereupon the sections can be rotated with the projecting ends of this pin traversing the circumferential way 26 between the corresponding plates 24 and screw ring 19. When the projecting ends of this pin 23 come into register with the ways 25 the two sections are free to telescope, these projecting ends passing between the pair of plates 24. The pin 23 of the section 15a can be freed from the end notches 33 of the section 15 in a similar manner. If the projecting ends of this pin are held in any of the bayonet notches 34, the sections are first moved axially and then rotated so as to free the projecting ends of this pin from the pair of bayonet slots 34 and place them in the ways 31 in which position the sections 15 and 15a are free to be telescoped.

If it is desired to uncouple any section from another section all that is necessary is to unscrew the corresponding screw ring 19. The smaller section can then be withdrawn completely from the larger section, the projecting ends of its pin 23 passing through the axial way 25 between the plates 24 of the larger section.

It will be seen that the form of the ways provided between the semi-cylindrical plates and the arrangement of the bayonet slots to receive and retain the projecting ends of the next succeeding smaller tubular section can be varied in many ways to suit the particular manipulation desired to set up and nest the mast.

Thus, in Fig. 11 one of the tubular sections 38 of the telescopic structure is shown as having a pair of semi-cylindrical plates 39, 40 fitted and riveted in its outer end, these plates being similar to the plates 24 and 30 of the form of the invention shown in Figs. 1–10. As with the form of the invention shown in Figs. 1–10, the opposing edges of the semi-cylindrical plates are spaced from each other to provide ways 41 for the projecting ends of the cross pin 46 at the inner end of the next succeeding smaller section (not shown). However, in the form of the invention shown in Fig. 11 each of these ways 41 has a relatively wide entrance portion 42 leading to a circumferential continuation 43 of this way. At the end of this circumferential continuation 43 a notch 44 is provided in the plate 40 so that the circumferential continuation 43 and notch 44 jointly form a bayonet slot for receiving and retaining the projecting ends of the pin 46 of the next smaller section.

Further, in the form of the invention shown in Fig. 11, the retaining screw rings 19 are eliminated and instead the outer end of each section, with the exception of the tip section, is flanged inwardly, as indicated at 45. With such integral flanges 45, the sections 38 are, of course, permanently coupled together.

In the form of the invention shown in Figs. 12 and 13, one of the tubular sections 48 is shown as having a pair of semi-cylindrical plates 49, 50 fitted and riveted in its outer end, these plates being similar to the plates 24 and 30 of the form of the invention shown in Figs. 1–10. As with the form of the invention shown in Figs. 1–10, the opposing edges of each pair of semi-cylindrical plates are spaced from each other to provide a way 51 for the projecting ends of the cross pin at the inner end of the next succeeding smaller section (not shown). Also the diametrically opposite edges of these plates 49 and 50 are shown as provided with a series of pairs of bayonet slots 52 along these ways 51, these bayonet slots functioning in the same manner as the bayonet slots 34 in the form of the invention shown in Figs. 1–10. However, the ways 51 are of helical form as compared with the straight axial ways 31 in the form of the invention shown in Figs. 1–10 and the bayonet slots 52 also are in the form of a series of steps so that the projecting ends of the cross pin pass from one bayonet slot to the other in collapsing the structure. The difference in manipulating the form of the invention shown in Figs. 12 and 13 is believed to be readily apparent.

The essential difference between the form of the invention shown in Figs. 1–10 and the forms of the invention shown in Figs. 11 and 12 is that in the form of the invention shown in Figs. 1–10 the pins 23, in the extended position of the mast, are arranged at the outer ends of the laps between the sections 15a and 15b since they rest in the notches 28 provided at the outer extremities of the plates 24. In the forms of the invention shown in Figs. 11 and 12 the pins are arranged close to the inner extremity of each section 38, 48 and in the extended position of the mast are located a substantial distance from the outer extremity of the lap between each pair of sections. As a result the holes for the pins, in the form of the invention shown in Figs. 1–10, are drilled near the zone of greatest strain between the mast sections, this being, of course, at the outer extremities of the laps, and hence the simplicity of the form of the invention shown in Figs. 1–10 is achieved at some sacrifice to the strength of the mast due to the weakening resulting from drilling for the holes of the pins 23 near the zone of greatest strain. Conversely, while the constructions shown in Figs. 11 and 12 are more complicated, the drilling of the holes for the pins is near the inner extremity of each section and at the inner extremities of the laps between the sections so that the mast is weakened to the least degree by such drilling.

From the foregoing it will be seen that the pairs of semi-cylindrical plates secured in the outer end of the tubular telescopic sections and spaced to provide ways and notched to provide retaining recesses for the projecting ends of a cross pin for the next smaller tubular telescopic section provide a simple, inexpensive and extremely sturdy joint for releasably holding the sections extended and at the same time permitting them to be nested by a simple manipulation of the sections.

I claim as my invention:

1. A telescopic structure, comprising inner and outer slidably and rotatably interfitted cylindrical tubes, the inside diameter of said outer tube being substantially larger than the outside diameter of said inner tube to form an annular chamber therebetween, a pair of members projecting laterally outwardly from one end of said inner tube and from opposite sides thereof into said chamber, and a pair of semi-cylindrical plates within said chamber conforming to the bore of said outer tube, means securing said plates to opposite sides of said bore, said plates having opposing axially extending edges spaced to provide a pair of axially extending ways of sufficient width to receive said members of said inner tube, each of said plates having a recess to receive the corresponding member and releasably support said inner tube in an extended position.

2. A telescopic structure, comprising inner and outer slidably and rotatably interfitted cylindrical tubes, the inside diameter of said outer tube being substantially larger than the outside diameter of said inner tube to form an annular chamber therebetween, a pair of members projecting laterally outwardly from one end of said inner tube and from opposite sides thereof into said chamber, a pair of semi-cylindrical plates within said chamber conforming to the bore of said outer tube, means securing said plates to opposite sides of said bore, said plates having axially extending edges spaced to provide a pair of axially extending ways of sufficient width to receive said members of said inner tube, said plates fitting the periphery of said inner tube, each of said plates having along one of its edges defining a corresponding one of said ways a bayonet slot adapted to receive a corresponding one of said members and releasably support said inner tube in an extended position.

3. A telescopic structure, comprising inner and outer slidably and rotatably interfitted cylindrical tubes, the inside diameter of said outer tube being substantially larger than the outside diameter of said inner tube to form an annular chamber therebetween, a flange projecting inwardly from one end of said outer tube and engaging the periphery of said inner tube to close the corresponding end of said chamber, a pair of members projecting laterally outwardly from one end of said inner tube and from opposite sides thereof into said chamber, a pair of semi-cylindrical plates within said chamber conforming to the bore of said outer tube, means securing said plates to opposite sides of said bore, said plates having axially extending edges spaced to provide a pair of axially extending ways of sufficient width to receive said members of said inner tube, said plates fitting the periphery of said inner tube and being spaced from said flange to provide a circumferential way of sufficient width to receive said members, said plates each having along its circumferential edge adjacent said flange of said outer tube a notch adapted to receive the corresponding one of said members and releasably support said inner tube in an extended position, and each of said plates also being each provided along one of its edges defining a corresponding one of said ways with a series of spaced bayonet slots each adapted to receive a corresponding one of said members and releasably support said inner tube in a corresponding extended position.

4. A telescopic structure, comprising inner and outer slidably and rotatably interfitted cylindrical tubes, the inside diameter of said outer tube being substantially larger than the outside diameter of said inner tube to form an annular chamber therebetween, an annular flange projecting inwardly from one end of said outer tube and engaging the periphery of said inner tube to close the corresponding end of said chamber, a pair of members projecting laterally outwardly from the opposite end of said inner tube and from opposite sides thereof into said chamber, and a pair of semi-cylindrical plates within said chamber conforming to said outer tube; means securing said plates to opposite sides of said bore; said plates having opposed axially extending edges spaced to provide a pair of axially extending ways of sufficient width to receive said members of said inner tube, and said plates also being spaced from said flange to provide a circumferential way of a width sufficient to receive said members, and said plates each having in that edge defining said circumferential way a notch adapted to receive a corresponding one of said members and releasably support said inner tube in an extended position.

GEORGE O. BENSON.

REFERENCES CITED

The following references are of record in the file of this patent:

UNITED STATES PATENTS

| Number | Name | Date |
|---|---|---|
| 662,748 | Wood | Nov. 27, 1900 |
| 993,121 | Stone et al. | May 23, 1911 |
| 1,505,318 | Berlow | Aug. 19, 1924 |
| 1,951,754 | Gilbert | Mar. 20, 1934 |
| 2,047,485 | McBrady | July 14, 1936 |
| 2,265,794 | Aske | Dec. 9, 1941 |